(No Model.)

E. H. JEEVES.
TUBE SCRAPER.

No. 464,756. Patented Dec. 8, 1891.

Witnesses:
John Grist
A. A. Horsey.

Inventor:
Edward H. Jeeves
By Henry Grist
Attorney.

UNITED STATES PATENT OFFICE.

EDWARD HEATHCOTE JEEVES, OF PORT ROWAN, CANADA.

TUBE-SCRAPER.

SPECIFICATION forming part of Letters Patent No. 464,756, dated December 8, 1891.

Application filed July 20, 1891. Serial No. 400,186. (No model.)

*To all whom it may concern:*

Be it known that I, EDWARD HEATHCOTE JEEVES, of Port Rowan, in the county of Norfolk, in the Province of Ontario, in the Dominion of Canada, have invented certain new and useful Improvements in Tube-Scrapers; and I do hereby declare that the following is a full, clear, and exact description of the same, reference being had to the accompanying drawings, in which—

Figure 1:
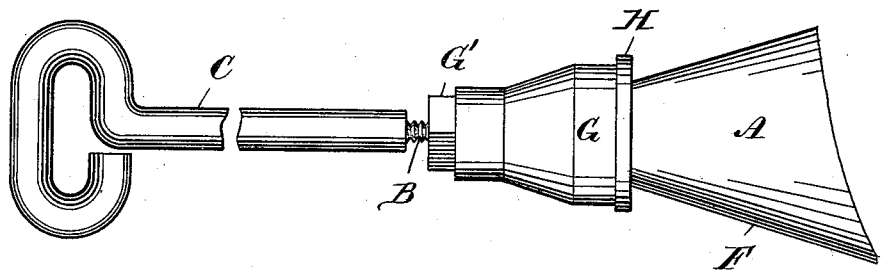
Figure 2:
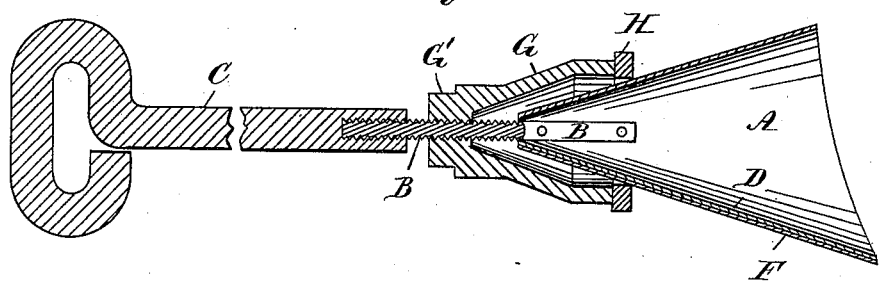
Figure 3:
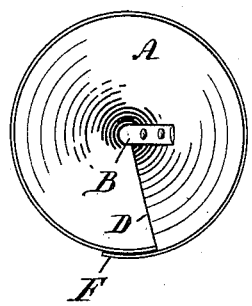

Figure 1 is an exterior view of a tube-scraper embodying my improvement. Fig. 2 is a longitudinal section of the same, and Fig. 3 is an end view of the scraper to which my improvement is applicable.

My invention relates to an improvement in tube-scrapers of that kind which consists of a piece of sheet steel cut to shape and bent to form a hollow conical head having two free overlapping edges from base to apex and a shank or handle attached to the smaller end; and my invention has for its object to limit and reduce the expansion of the scraper and adjust it to scrape tubes either hard or lightly or with more or less friction.

My invention consists of a bell-shaped socket, the smaller end screwing on the shank or handle and the larger end extending downwardly over the smaller end of the cone-head of the scraper, so that by turning the socket to screw against the scraper-head said head will be circumferentially contracted at the larger end to suit the size of the tube to be scraped, such contraction being effected by the free end of the socket pressing against the head of the scraper on the outside.

A represents the head of the scraper, made of a piece of sheet-steel cut to proper shape and bent to form a hollow cone, the edges overlapping and free to move one over the other, whereby the larger end of the conical head can be diminished in diameter by circumferential compression, so as to preserve the circular configuration to fit tubes of various sizes and expand within the tube to have contact with the internal circumference and have sufficient elasticity to expand and follow the tube internally to cut away, scale, or dislodge accumulations in the tube.

The smaller end of the conical head A of the scraper is attached to a handle C by a shank B, or said handle may be attached directly to the head, or other suitable means of connecting the head to the handle may be adopted. The handle or shank is attached to the head so as to leave both overlapping edges D F free to contract and expand circumferentially throughout the length of the head, whereby the diameter of the base will yield flexibly to suit various sizes of tubes.

The foregoing is a brief description of a tube-cleaner to which my improvement is applicable, and I will now proceed to describe my invention.

G is a bell-shaped socket, or a socket having a contracted end screwing on the shank B or handle C, as may be desired, and the larger end of said socket extends over the smaller end of the cone-head A of the scraper, so that when the socket is screwed toward the head A the larger end of the socket will press against the outside of the head A and forcibly contract the larger end to suit the tube to be scraped, and by adjusting the screw-socket to the proper degree the scraper may be made to pass through the tube with greater or less friction, according to the density of the matter in the tube whose removal is desired. The socket G is preferably provided with a polygonal member G' for receiving the jaws of a wrench to turn the socket.

H is a ring follower or washer through which the smaller end of the cone-head A is passed before screwing the socket in place, and said ring seats against the outside of the cone scraper-head and receives the thrust of the socket G when screwed to its bearings, and said ring, by frictional contact with the outside of the head A, reduces the friction of the socket while being turned against the ring, said ring by the pressure of the socket then contracting the head A, whereby the larger end of the cone will be diminished in circumference to suit the tube and the débris to be removed; but, if desired, said ring may be dispensed with.

I claim as my invention—

1. The combination, with the cone-head A, having free overlapping edges from base to apex and a shank or handle secured to the smaller end, of a socket G, having a contracted end screwing on said shank or handle and extending over the outside of the said cone-head A, so that by screwing said socket the larger end of the cone will be contracted by pressure of the socket to suit the tube, as set forth.

2. The combination, with a contracting and expanding cone-head scraper A, having a shank or handle attached to the smaller end, of a socket G, screwing on said shank or handle, and a ring follower or washer H intervening said head and end of the socket to frictionally receive the thrust of the socket when contracting the head A, as set forth.

EDWARD HEATHCOTE JEEVES.

Witnesses:
M. AUSNY,
T. R. SLAGHT.